(12) United States Patent
Holtzman

(10) Patent No.: US 6,373,003 B1
(45) Date of Patent: *Apr. 16, 2002

(54) MARKING DEVICE FOR ELECTRONIC PRESENTATION BOARD

(75) Inventor: Rafi Holtzman, San Mateo, CA (US)

(73) Assignee: Electronics for Imaging, Inc., Foster CIty, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/170,817

(22) Filed: Oct. 13, 1998

(51) Int. Cl.[7] .............................................. G08C 21/00
(52) U.S. Cl. ................................ 178/19.01; 178/19.02
(58) Field of Search .................................. 345/173, 179; 178/18.01, 18.03, 19.01, 19.03, 19.04, 19.05, 19.02

(56) References Cited

U.S. PATENT DOCUMENTS

| | | | | |
|---|---|---|---|---|
| 3,613,066 A | | 10/1971 | Cooreman | 340/347 |
| 4,506,354 A | * | 3/1985 | Hansen | 367/101 |
| 4,758,691 A | | 7/1988 | De Bruyne | 178/19 |
| 4,777,329 A | * | 10/1988 | Mallicoal | 178/18.01 |
| 4,814,552 A | * | 3/1989 | Stefik et al. | 178/19.02 |
| 5,239,139 A | * | 8/1993 | Zuta | 178/19.02 |
| 5,248,856 A | * | 9/1993 | Mallicoal | 178/18.01 |
| 5,369,227 A | * | 11/1994 | Stone | 178/19.01 |
| 5,866,856 A | * | 2/1999 | Holtzman | 345/179 |

* cited by examiner

Primary Examiner—Vijay Shankar
(74) Attorney, Agent, or Firm—Michael A. Glenn

(57) ABSTRACT

A transmitter device is disclosed for use with a conventional pen in which the ultrasound transmitter is a cylindrical element lying coaxial with the pen and adjacent to its tip, and a jointed eraser structure. Conventional triangulation techniques are used to track the position and motion of a writer or eraser. An encoding facility associated with the pen provides the ability to distinguish whether the pen is used for marking or an as erasing implement, as well as determining the nature or character of written line width or eraser swath. A data stream thus generated can be used in a variety of ways, such as for example, to feed information into the memory of a digital computer, and/or to feed information for transmission to remote stations.

2 Claims, 6 Drawing Sheets

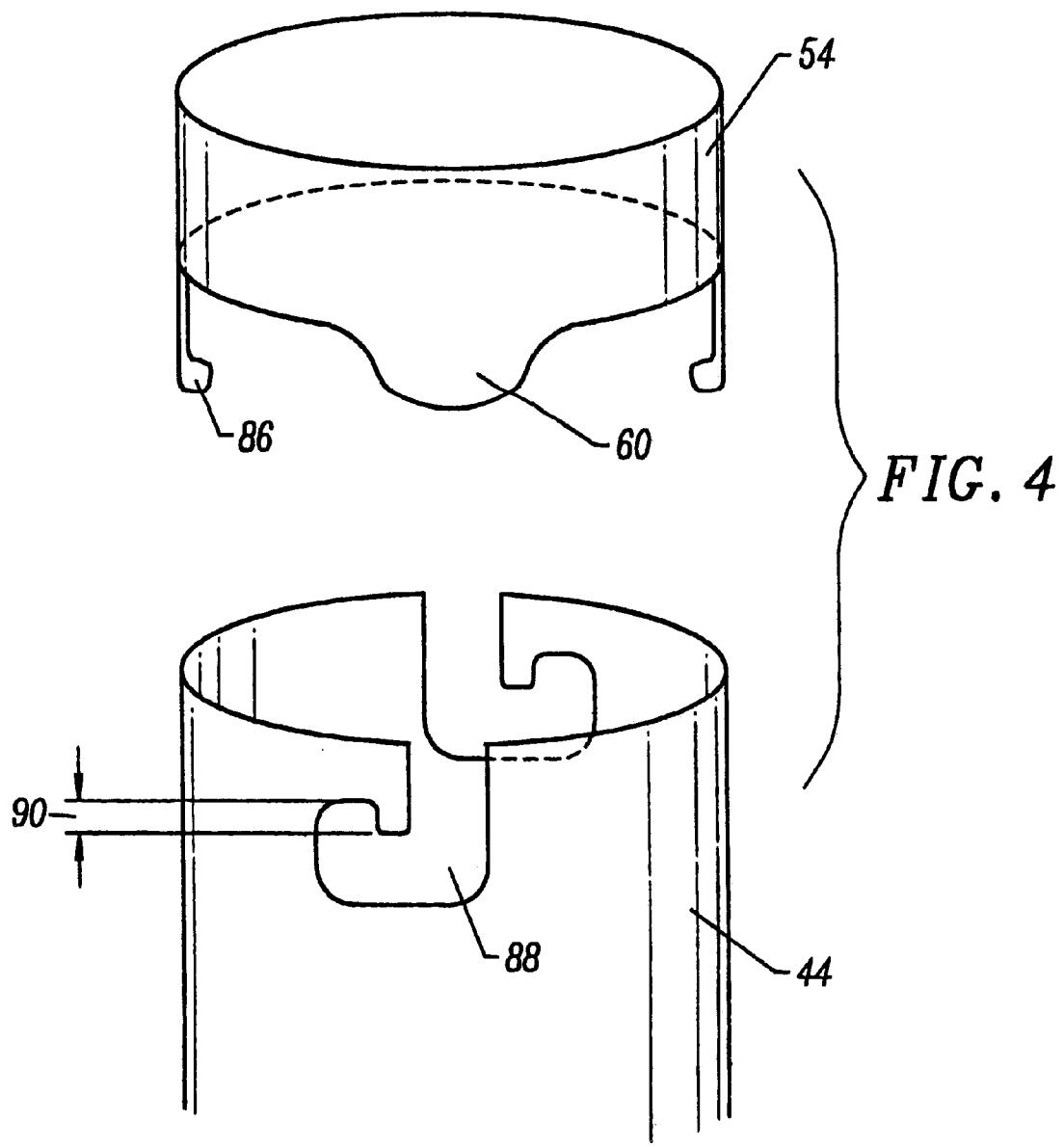

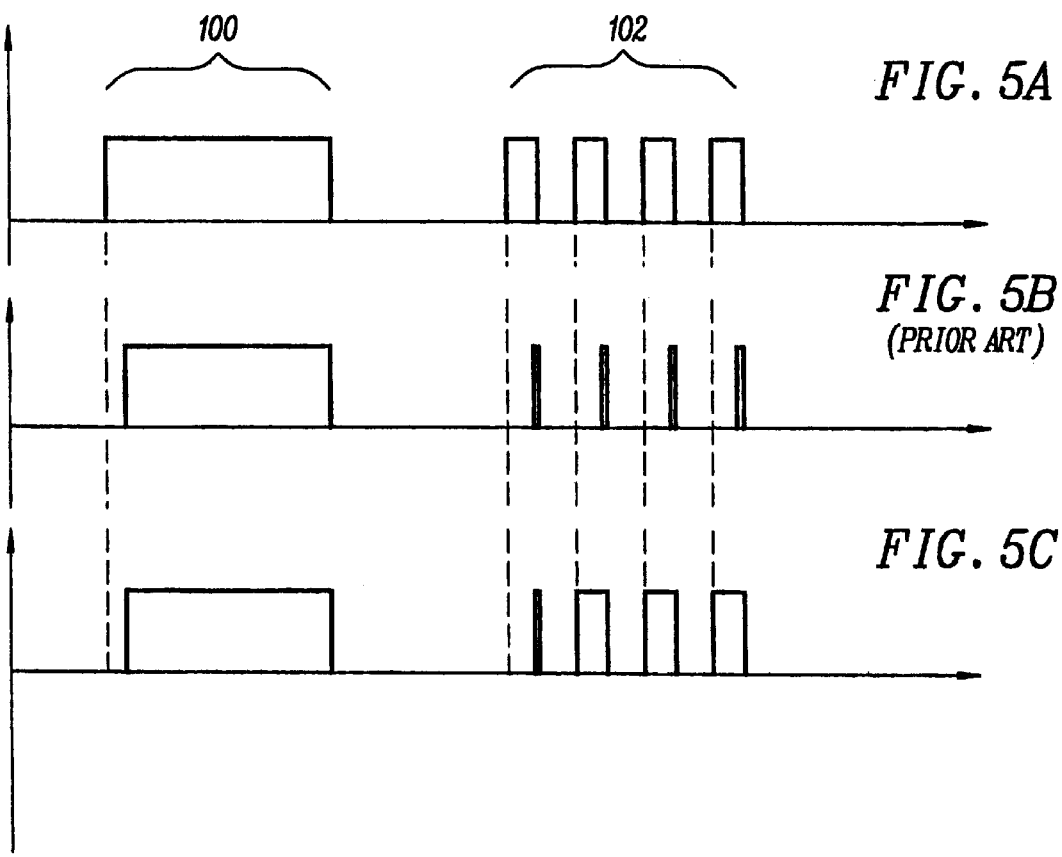

MARKING DEVICE FOR ELECTRONIC PRESENTATION BOARD

BACKGROUND OF THE INVENTION

1. Technical Field

The invention relates to an electronic presentation board. More particularly, the invention concerns devices for use with conventional presentation boards and pens for digitizing lines drawn manually.

2. Description of the Prior Art

It is known to use various techniques for determining the position of a writing implement or stylus on a flat surface. U.S. Pat. No. 4,564,928 to Glenn et al., U.S. Pat. No. 4,886,943 to Suzuki et al., U.S. Pat. Nos. 4,910,363 and 5,073,685 to Kobayashi et al., and U.S. Pat. No. 5,097,102 to Yoshimura et. al. all disclose systems in which a vibrating element associated with a pen transmits vibrations through the material of the board. The vibrations are detected by transducers attached to the board and the position of the pen is calculated from the transmission time of the vibrations through the board. A new, slightly different approach is disclosed in *Pen Computing Magazine*, February 1998, p. 36. Pressure-sensitive technology is used with a writing surface consisting of two conductively coated sheeted of material and spaced 0.03 inches apart. A separate touch panel at the side of the board must be used to identify pen color or indicate that an eraser is being used. Another model features a pen tray with optical sensors to automatically recognize the color of the selected pen. These systems inherently function exclusively when the pen is in contact with the board such that vibrations or pressure is transferred to the board. As a result, no special mechanism is required to distinguish writing from non-writing pen movements.

These systems typically require highly specialized board structures which renders them expensive and inconvenient.

An alternative approach is the use of airborne ultrasound signals. Examples of such systems are described in U.S. Pat. No. 4,777,329 to Mallicoat, U.S. Pat. No. 4,814,552 to Stefik et al., U.S. Pat. No. 4,506,354 to Hansen and U.S. Pat. No. 1,758,691 to De Bruyne. These systems employ various combinations of ultrasound transmitters and receivers arranged at two points fixed relative to a board and on a movable writing implement. The position of the movable implement is then derived by triangulation. The systems typically require an additional hard-wired or electromagnetic link between the movable implement and a base unit to provide timing information for time-of-flight ultrasound calculations. An additional switch is also required to identify when the movable element is in contact with the board.

These systems are typically limited to relatively small boards. This is because of signal to noise ration (SNR) limitations. The volume of ultrasound used cannot be very high without causing bothersome accompanying whistling noises. Additionally, in a wireless system, power considerations severely limit the transmitted volume. To generate reliable position information, the transmitter-to-receiver distance must therefore be kept small. Attempts to use different sets of receivers for different regions of a large board generally result in discontinuities when the movable element travels from one region to another.

Another shortcoming of these systems is their inability to reproduce rapid interrupted pen strokes such as performed when drawing a dashed line. Typically, the transmitter or receiver element in the pen turns off when the pen is inactive and is re-activated each time the pen comes in contact with the board. The system then takes a fraction of a second to resynchronize before it responds correctly. In the case of short strokes, the length of the operative stroke may be comparable with the response time of the system, thereby giving very poor results.

An additional problem of the airborne ultrasound digitizer systems is that the ultrasound transmitter or receiver element is mounted asymmetrically to the side of the drawing implement. As a result, the measured position is offset from the true drawing position in a direction which changes with rotation of the drawing implement. This may result in discontinuities and illegible writing in the digitized images when the drawing implement position is changed between strokes.

Finally, conventional presentation board digitizer systems are typically limited to use with specially produced writing implements. This renders them expensive since pens have a very limited lifetime. Even where the ink cartridge is separately replaceable, the components used must be of a very specific design to be compatible.

There is therefore a need for a reliable, low cost, digitizer system which may be used with conventional presentation boards of all sizes for determining accurately the position of a drawing implement on the board. It would also be advantageous to have a transmitter device for use with presentation board which can be used with a wide range of conventional writing implements.

SUMMARY OF THE INVENTION

The invention provides an electronic presentation board for use with presentation boards of all sizes. The presentation board includes a digitizer system for digitizing operative strokes of a drawing implement carrying a transmitter against the board. The preferred system includes at least two receivers mounted relative to the board for receiving airborne signals. A processor responsive to outputs from said at least two receivers calculates a current position of the transmitter, said processor being additionally responsive to identify contact between the drawing implement and the board, thereby identifying operative strokes of the drawing implement.

An alternative embodiment of the invention provides a transmitter device for use with a system for digitizing operative strokes of a hand held drawing implement. In this embodiment of the invention, the drawing implement has a body and an operative tip. The transmitter device includes a housing having a substantially cylindrical opening terminating at a first end in an annular wedge surface with a central bore. The housing receives a portion of the body of the drawing implement with its operative tip extending from the central bore. The device also includes a retainer that is attachable to a second end of the opening to retain the drawing implement within the housing. The retainer has a spring element for biasing the drawing implement towards the annular wedge surface. A transmitter is mounted relative to the housing proximal to the central bore.

BRIEF DESCRIPTION OF THE DRAWINGS

FIG. 4 is a schematic perspective view of a preferred structure for attachment of a retaining member to a housing for use in the transmitter device of FIG. 2;

FIG. 5A is a plot of the output of a contact switch activated by operational contact between a drawing implement and a presentation board as a function of time;

FIG. 5B illustrates the recorded drawing implement operation time profile produced by prior art systems corresponding to the contact profile of FIG. 3A;

FIG. 5C illustrates the corresponding recorded drawing implement operation time profile produced according to a first embodiment of a presentation board digitizer system, constructed and operative according to the invention.

DETAILED DESCRIPTION OF THE PREFERRED EMBODIMENT

The invention provides a presentation board digitizer system for use with presentation boards of all sizes and which may be used with replaceable conventional pen elements.

Figure 1:
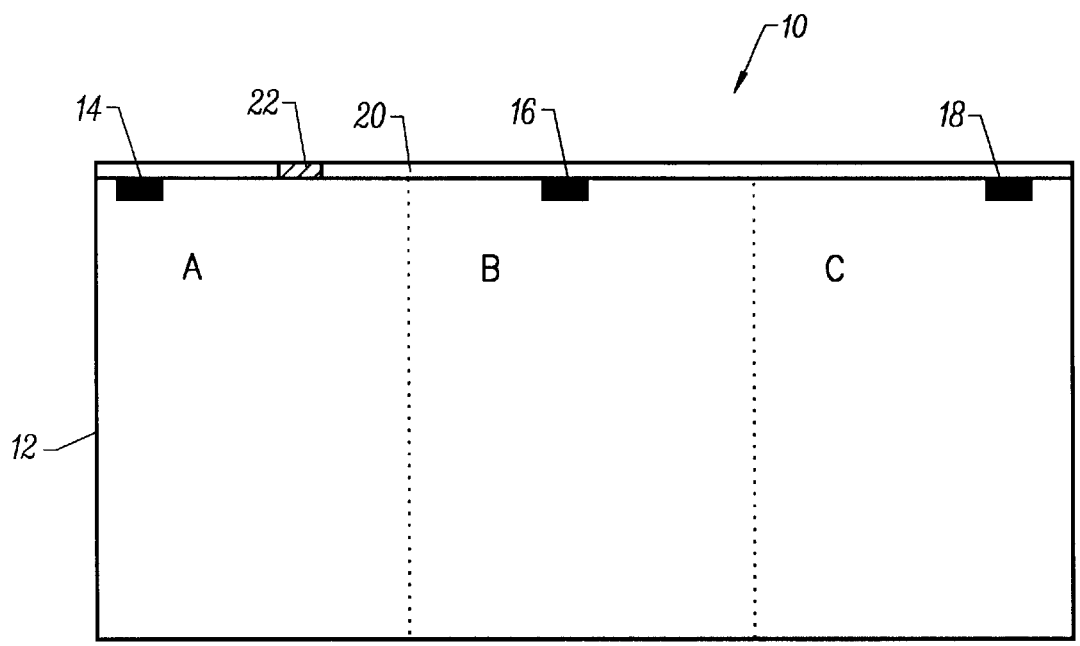
FIG. 1 is a schematic front view of a presentation board according to the invention.

FIG. 1 shows a presentation board digitizer system, generally designated 10, constructed and operative according to the invention. System 10 features a presentation board 12, which may be of any conventional type, provided with a plurality of receiver assemblies 14, 16, and 18. The receiver assemblies 14, 16, and 18 are preferably mounted in a strip 20 adapted for convenient attachment to presentation boards of different sizes and thicknesses. This attachment may be achieved through clamps or clips of any type (see, for example, commonly assigned patent application, U.S. Ser. No. 08/804,492, filed Feb. 21, 1997 (Retrofittable Apparatus For Converting A Substantially Planar Surface Into An Electronic Data Capture Device). Strip 20 also features a receiver 22. The present position of the movable element is derived from the time-of-flight (TOF) of signals from the movable element to the receiver assemblies by triangulation. An additional signal provides information such as, for example, the color of a pen being used.

In principle, two receivers are sufficient to determine the position of a movable element in contact with board 12. However, to provide reliable reception over the entire area of a large board, system 10 employs more than one set of receivers. Thus, in the system as illustrated, a first set of receivers is defined as the pair of receiver assemblies 14 and 16, and a second set of receivers is defined as the pair of receiver assemblies 16 and 18. The first set of receivers so defined is positioned for receiving a signal from the transmitter when the movable element is in a first region denoted A, and the second set of receivers is positioned for receiving the signal when the movable element is in a second region denoted C. Thus, optimal precision and reliability is achieved by deriving the position of the movable element from the outputs of receiver assemblies 14 and 16 when the movable element is in region A, and from the outputs of receiver assemblies 16 and 18 when the movable element is in region C. It should be appreciated that other position detection schemes may be used in connection with practice of the herein disclosed invention.

Figure 2:
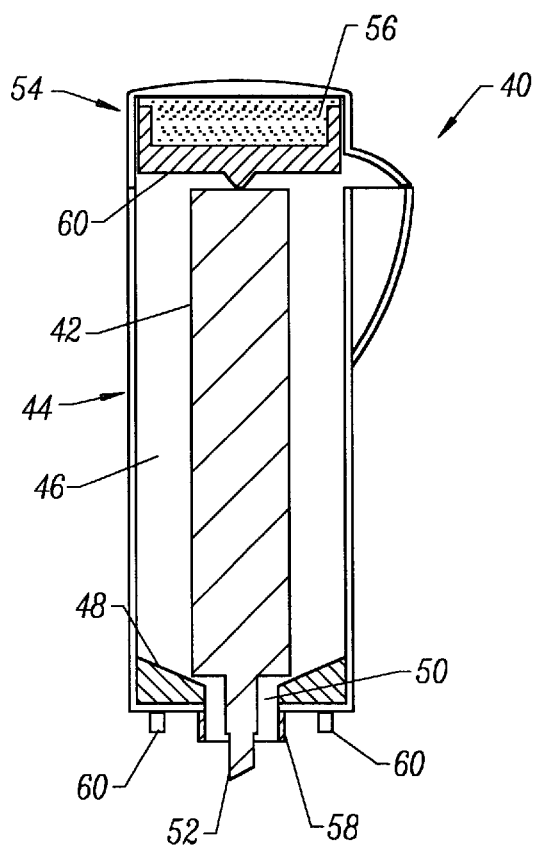
FIG. 2 is a side cross sectional view of a transmitter device, constructed and operative according to the invention, used with a conventional drawing implement in a digitizer system.

FIGS. 2–4 show a preferred embodiment of a transmitter device, generally designated 40, constructed and operative according to the invention, for use with a drawing implement 42 in a digitizer system. Transmitter device 40 may be used to advantage with a wide range of digitizer systems including, but not limited to, the presentation board digitizer systems described above.

Generally speaking, transmitter device 40 includes a housing 44 having a substantially cylindrical opening 46 which terminates at its lower end in an annular wedge surface 48 having a central bore 50. Drawing implement 42 is received within opening 46 with its operative tip 52 extending through bore 50.

Transmitter device 40 also includes a retainer 54 in the form of a cover attachable to the upper end of opening 46 to retain drawing implement 42 in position within housing 44. Retainer 54 features a spring element 56 for biasing drawing implement 42 towards annular wedge surface 48. A transmitter 58 is mounted on the lower surface of housing 44 proximal to bore 50.

It is a particular feature of preferred embodiments of the transmitter device that they can accommodate drawing implements of a range of lengths and widths. To this end, spring element 56 adjusts to any variations in length, and biases drawing implement 42 towards the lower end of housing 44 to ensure a correct position for use. This biasing, in conjunction with the shape of annular wedge surface 48, serves to center the front end of a drawing implement of any size or shape. In addition, spring element 56 is preferably provided with a shaped abutment surface 60 having features for centering the back end of a drawing implement. Typically, abutment surface 60 has an axial conical projection as shown for centering drawing implements by engaging a rear axial recess which is common to almost all presentation board pens. Alternatively, abutment surface 60 maybe be formed with a conical recess or other features for centering the back of a drawing implement.

It should be noted that the combination of annual wedge surface 48 and spring element 56 with abutment surface 60 serves to hold drawing implements of a range of lengths and widths in central alignment within cylindrical opening 46 without contacting the sides of housing 44. This arrangement makes transmitter device 40 insensitive to variations in drawing implement width. The avoidance of frictional contact with the sides of housing 44 is also important for efficient operation of a contact sensing microswitch, as is described below.

Figure 3A:
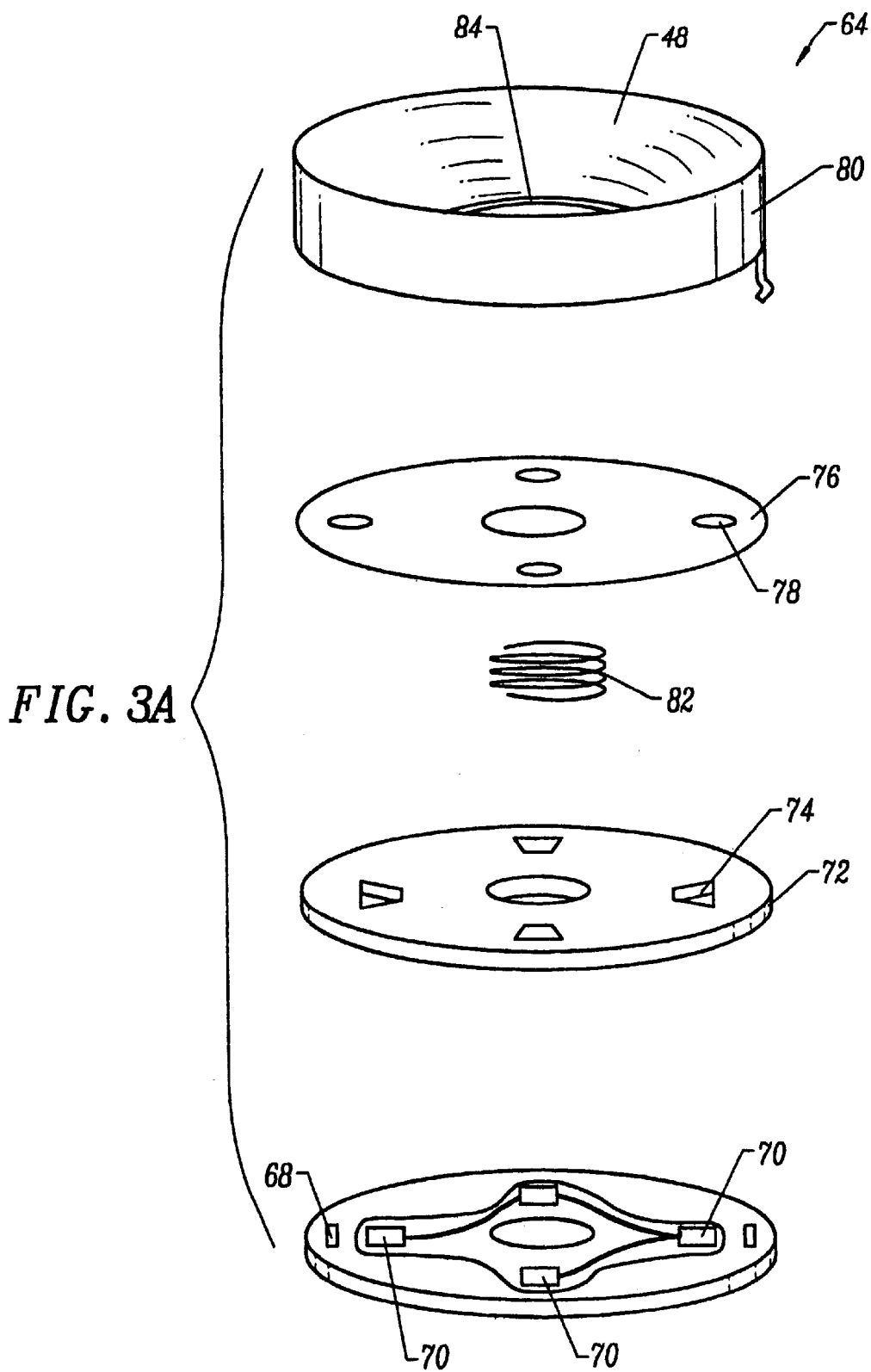
FIG. 3A is an exploded perspective view of a microswitch structure, constructed and operative according to the invention, for use in the transmitter device of FIG. 2.
Figure 3B:
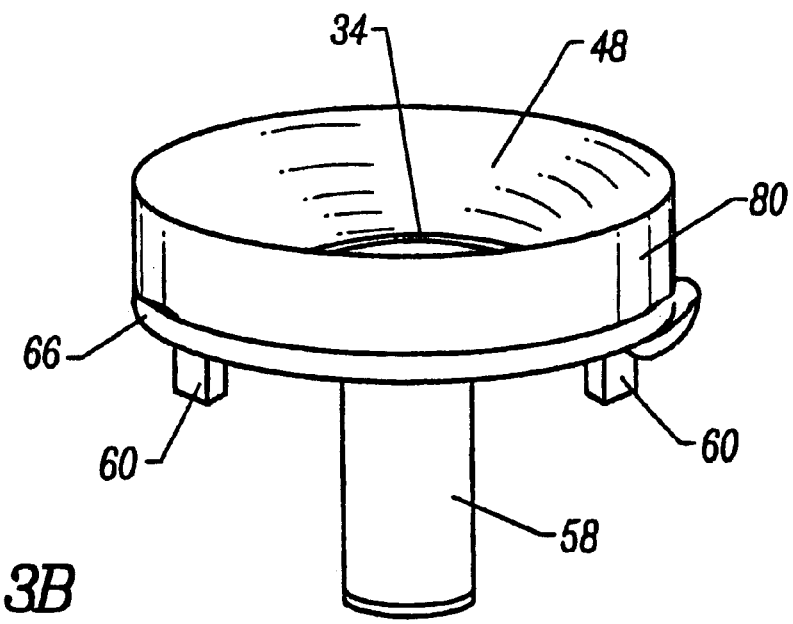
FIG. 3B is a perspective view of the microswitch structure of FIG. 3A assembled.
Figure 3C:
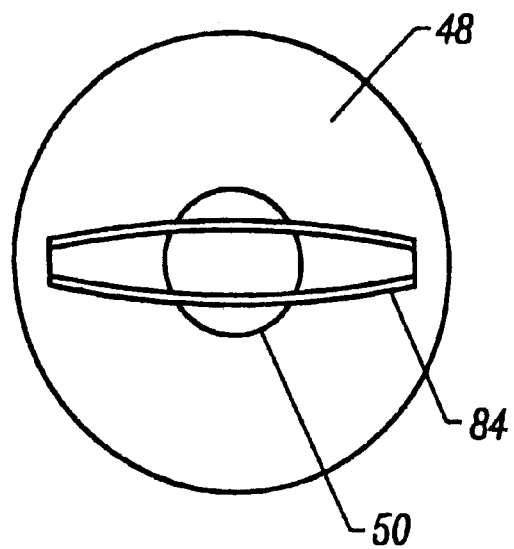
FIG. 3C is a top view of the microswitch structure of FIG. 3A showing a retaining spring arrangement.

FIGS. 3A–3C show a preferred construction for a microswitch as discussed above, generally designated 64, constructed and operative according to the teachings of the present invention.

The microswitch 64 is formed from three functional layers. First, a base layer 66 provides the two terminals of the microswitch, a single peripheral contact 68, and a set of common contacts 70, spaced-apart around the center of a base layer 66. On top of the base layer 66 lies a layer of conductive resilient foam 72 having cut-out holes 74 opposite contacts 70. A third rigid conducting layer 76 lies above the foam layer 72. The conducting layer 76 has small conductive downward projections 78 aligned with holes 74. An upper cover 80, integrally formed with an annular wedge surface 48, attaches loosely to the base layer 66 to unify the structure while allowing sufficient vertical motion for operation of the switch. Each layer has a central bore, together corresponding to the bore 50 of FIG. 2.

In a non-compressed state, conductive contact is made between the peripheral contact 68 and the foam layer 72 and between the foam layer 72 and the upper conducting layer 76. However, the switch remains open because the thickness of the foam layer 72 prevents contact between projections 78 and the inner contacts 70. When pressure is applied to compress the microswitch 64, the foam layer 72 becomes compressed until the projections 78 come into contact with the inner contacts 70, thereby closing the switch. In principle, release of the pressure allows the foam layer to return to its initial state, thereby breaking the circuit. However, in practice, the relaxation response time of the foam material is typically quite slow. For this reason, a spring 82 is mounted between the base layer 66 and the upper conductive layer 76 such that, when the pressure is released, the upper conductive layer 76 is lifted immediately so as to break the circuit.

It will be clear that, when the drawing implement 42 is not in use, the spring element 56 urges the drawing implement 42 downwards against an annular wedge surface 48 so as to close the microswitch 64. When the drawing implement 42 is used to draw on a presentation board, a force is exerted on an operative tip 52 of the drawing implement 42 towards the housing 44, causing the drawing implement 44 to recoil slightly against the spring element 56. This reduces the pressure exerted on the annular wedge surface 48 as the circuit of microswitch 64 opens. The electronic circuitry of the transmitter device 40 is responsive at least to opening of the microswitch 64 to affect a signal transmitted by the transmitter device 40.

FIG. 3B shows the microswitch 64 assembled, together with an ultrasound transmitter 58 and IR transmitters 60. FIG. 3C shows a pair of spring elements 84 which are mounted within the annular wedge surface 48 so as to grip the end of a drawing implement inserted through the central bore 50. This ensures that the upper layer of the microswitch 64 is sensitive to movements of the drawing element 42.

It should be noted that the structure described here for the microswitch 64 is by way of example only. Alternative structures may be used such as, for example, a switch based on a piezoelectric pressure sensor or the like.

Finally with regard to the microswitch 64, it should be noted that correct operation of the switch depends on a degree of freedom of axial motion of the drawing implement 42 against the spring element 56. For this reason, it is important that the spring element 56 is not fully compressed when the retainer 54 is attached. FIG. 4 shows an example of a preferred structure for attachment of the retainer 54 to the housing 44, in which lateral projections 86 engage channels 88 which are shaped to provide a margin of release 90 when fully engaged. The margin of release 90 is designed to be at least sufficient to allow an operative range of motion of the microswitch 64.

FIG. 5A is a plot of the output of a contact switch activated by operational contact between a drawing implement and a presentation board as a function of time. FIG. 5A shows a drawing stroke period 100 for a continuous line segment, as well as individual stroke periods 102 for a dashed line. FIG. 5B illustrates the recorded drawing implement operation time profile produced by prior art systems corresponding to the contact profile of FIG. 3A. It can be seen that for the continuous line segment (period 100), the effects of signal loss (shown by the dashed line) are not sufficient to interfere with tracking of the line. Thus, there is a small signal loss at the beginning of the period, but the majority of the stroke is recorded well. However, during period 102 the system response time is comparable to the length of the pen strokes. As a result, the dashed line is almost completely lost.

The preferred embodiment of the invention solves the foregoing problem by maintaining synchronization between the transmitter device 40 and the receiver system for a given period of time after the end of each pen stroke. This may be achieved, for example, by the use of electronic not shown circuitry that continues to operate the transmitter 58 for a given time interval after the microswitch 64 ceases to indicate a force exerted on the outer housing towards the operative tip of the drawing implement. False drawings signals are avoided by either disabling the transmitter 58 during the delay period, or by changing the content of the signal to indicate a non-contact pen state. The delay period is typically from about ½ second, and preferably between 1 and about 2 seconds, in duration.

FIG. 5C illustrates the corresponding recorded drawing implement operation time profile produced according to a first embodiment of a presentation board digitizer system, constructed and operative according to the invention. FIG. 5C shows the response profile of the transmitter device 40 as described. During an initial period of a single pen stroke, the response curve is similar to that shown on FIG. 5B for the prior art. However, when short repeated strokes are encountered, the transmitter device 40 maintains synchronization between successive strokes, thereby providing an accurate response immediately on switching of the microswitch 64.

Figure 6:
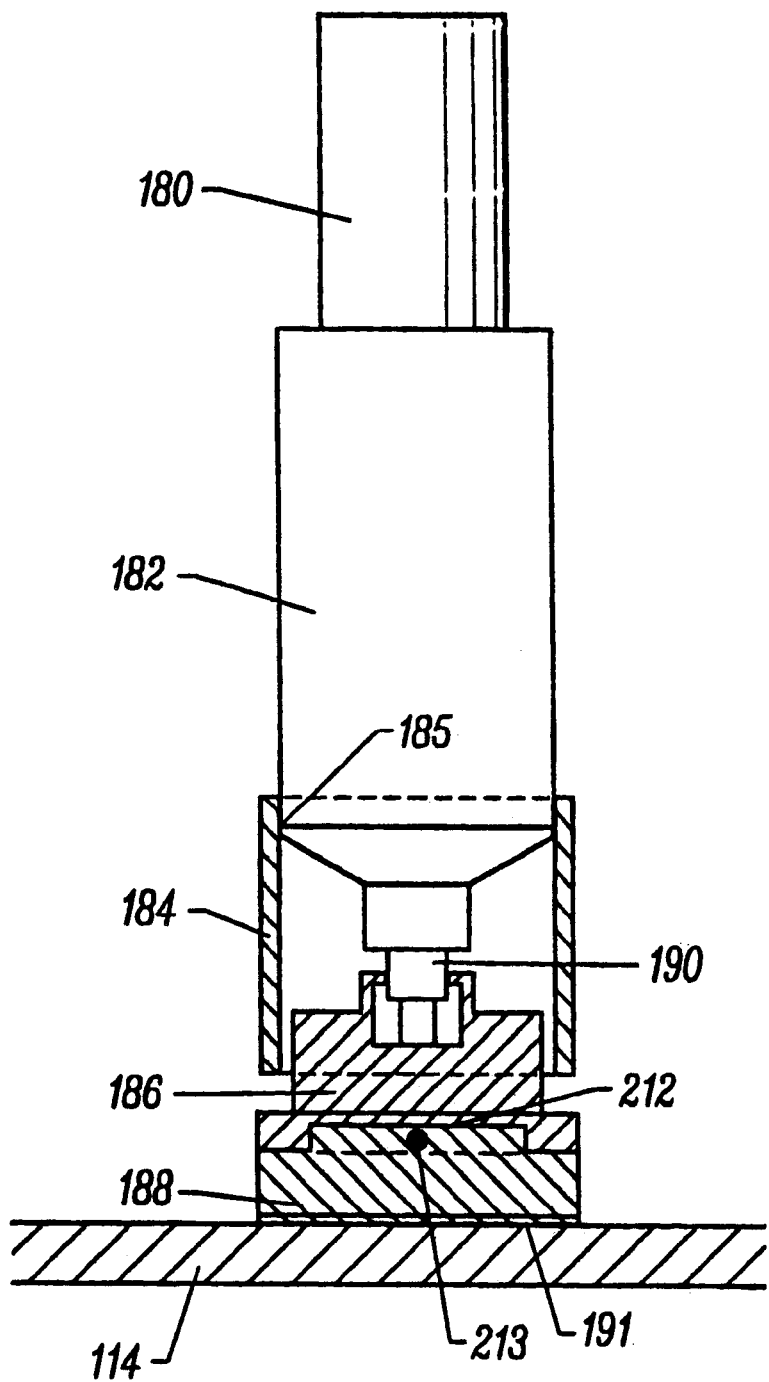
FIG. 6 is a side cross sectional view of an eraser transmitter unit, constructed and operative according to the invention, for use with a digitizer system.

FIG. 6 is a side cross sectional view of an eraser transmitter unit, constructed and operative according to the invention, for use with a digitizer system. While various multifunction writing implements have been identified above in connection with the prior art, it is thought that such devices are somewhat limited in their ability to operate in connection with various tracking schemes. Thus, some such implements are especially designed for optical schemes, while other implements are especially designed for electromagnetic tracking schemes. A major problem with eraser elements for use with digitizer systems is the common practice of employing only a part of the eraser surface. Because the digitizer is typically unable to distinguish between flat contact and edge contact of the eraser, the digitized image frequently shows a much greater erased area than has actually been cleared from the presentation board itself. To solve this problem, the invention provides an eraser that is constructed such that the eraser surface is self-orienting to lie parallel to the presentation board surface. This ensures that the contact area of the eraser element is always precisely defined.

The implement shown on FIG. 6 may be used for several purposes. Thus, the implement includes a sleeve 182 that comprises a handle, and an eraser 188, which has a substantially flat, eraser surface 191. The eraser surface is preferably circular. The handle and eraser may be connected by a pivot joint 212, which may be a ball and socket having two degrees of rotational freedom. The pivot joint ensures that the eraser assumes an orientation with the eraser surface 191 parallel to the presentation board surface substantially independent of the orientation of the handle. Connection of the handle to the pivot joint is through a spring assembly 213. The implement also includes a transmitter similar to the transmitter 40 discussed above. A pressure sensing microswitch 190 is mounted to sense contact pressure between the handle and the eraser and operate the transmitter accordingly.

The writing implement shown on FIG. 6 provides a sleeve 182 that has an inner diameter that is adapted to receive and securely retain a standard dry erase marker 180. Thus, one using the herein disclosed marking implement uses a marker that is familiar. The sleeve is tapered to follow the tapered contour of the pen and terminates with a switch 190 that detects movement of the pen tip, i.e. when the tip of the pen is placed to the writing surface. Such detection generates a signal that is communicated to the sensor array to indicate that the marking implement is now in contact with the writing surface (and not above the writing surface, as such detection would provide a false plane of information to the sensor array). Thus, the sensor array only tracks marking implement position when the marking implement is registered to the writing surface. Such signal may also communicate actual positional information, for example by providing a relay or feedback of tracking information received at the pen, such that a time based marking implement position may be derived.

Such signal may also be modulated or digitally coded to identify a particular marking implement function or color, for example whether the marking implement is a red or blue pen, whether the marking implement is drawing a thin line or a thick line, or whether the marking implement is an eraser. In connection with this last point, the marking implement herein disclosed includes a collar 184 that is adapted to be securely fitted to the sleeve 182. The collar activates a switch 185 that indicates it is fitted to the sleeve. A plunger 186 is movable fitted within the collar. An eraser 188 is securely received within the plunger.

In operation, the eraser is pressed to the writing surface to erase marking thereon. This action pushes the plunger into the collar, thereby activating the switch 190, and thereby indicating contact of the eraser with the writing surface. The presence of the collar operates the switch 185, thereby indicating that the marking implement is performing an eraser function. With regard to the actual determination of the position of the marking implement, the invention is readily adapted for use with any modern locating technique, including any of those techniques discussed above in connection with the prior art.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A transmitter device for use with a system for digitizing operative strokes of a handheld drawing implement, the drawing implement having a body and an operative tip, the transmitter device comprising:

a housing having a substantially cylindrical opening terminating at a first end with a central bore, said housing receiving at least a portion of the body of the drawing implement with its operative tip extending from said central bore;

a retainer attachable to a second end of said opening to retain said drawing implement within said housing; and a transducer mounted relative to said housing proximal to said central bore, wherein said transducer is a sound wave transmitter mounted coaxial with said drawing implement; and wherein timing information is conveyed by an ultrasound signal emitted from said transmitter.

2. The device of claim 1, wherein said housing further includes:

a microswitch actuated by changes in pressure exerted on said drawing implement so as to be responsive to a force exerted on the operative tip of the drawing implement towards said housing.

* * * * *